US008972436B2

(12) United States Patent
Ravikumar et al.

(10) Patent No.: US 8,972,436 B2
(45) Date of Patent: Mar. 3, 2015

(54) TRANSLATION MODEL AND METHOD FOR MATCHING REVIEWS TO OBJECTS (75) Inventors: Shanmugasundaram Ravikumar, Berkeley, CA (US); Nilesh Dalvi, Menlo Park, CA (US); Bo Pang, Sunnyvale, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 733 days.

(21) Appl. No.: 12/607,938

(22) Filed: Oct. 28, 2009

(65) Prior Publication Data
US 2011/0099192 A1 Apr. 28, 2011

(51) Int. Cl.
G06F 17/30 (2006.01)

(52) U.S. Cl.
CPC .................. G06F 17/30705 (2013.01)
USPC ........................................... 707/769

(58) Field of Classification Search
None
See application file for complete search history.

(56) References Cited

U.S. PATENT DOCUMENTS

| 6,137,911 | A  | * | 10/2000 | Zhilyaev ....................... 382/225 |
| 7,685,276 | B2 | * | 3/2010  | Konig et al. .................. 709/224 |
| 7,769,774 | B2 | * | 8/2010  | Martinez et al. .............. 707/769 |
| 7,890,514 | B1 | * | 2/2011  | Mohan et al. ................. 707/748 |
| 7,962,461 | B2 | * | 6/2011  | Ruhl et al. .................... 707/706 |
| 8,010,539 | B2 | * | 8/2011  | Blair-Goldensohn et al. ............................. 707/750 |
| 2002/0022956 | A1 | * | 2/2002 | Ukrainczyk et al. .............. 704/9 |
| 2003/0078899 | A1 | * | 4/2003 | Shanahan .......................... 706/8 |
| 2005/0091038 | A1 | * | 4/2005 | Yi et al. .......................... 704/10 |
| 2006/0004752 | A1 | * | 1/2006 | Harel et al. ....................... 707/6 |
| 2006/0129446 | A1 | * | 6/2006 | Ruhl et al. ...................... 705/10 |
| 2006/0143158 | A1 | * | 6/2006 | Ruhl et al. ....................... 707/3 |
| 2006/0229888 | A1 | * | 10/2006 | Colle et al. ..................... 705/1 |
| 2007/0078669 | A1 | * | 4/2007 | Dave et al. ...................... 705/1 |
| 2007/0078845 | A1 | * | 4/2007 | Scott et al. ....................... 707/5 |
| 2007/0100898 | A1 | * | 5/2007 | Petras et al. .................. 707/200 |
| 2007/0143122 | A1 | * | 6/2007 | Holloway et al. ................ 705/1 |
| 2008/0040355 | A1 | * | 2/2008 | Martinez et al. ............... 707/10 |
| 2008/0133488 | A1 | * | 6/2008 | Bandaru et al. .................. 707/3 |
| 2008/0154883 | A1 | * | 6/2008 | Chowdhury et al. ............. 707/5 |
| 2008/0195372 | A1 | * | 8/2008 | Chin et al. ....................... 704/2 |
| 2008/0215543 | A1 | * | 9/2008 | Huang et al. ..................... 707/3 |

(Continued)

OTHER PUBLICATIONS

Luciano Barbosa, Ravi Kumar, Bo Pang, Andrew Tomkins, "For a Few Dollars Less: Identifying Review Pages Sans Human Labels", The 2009 Annual Conference of the North American Chapter of the ACL, pp. 494-502, Jun. 2009.

(Continued)

Primary Examiner — Robert Beausoliel, Jr.
Assistant Examiner — Richard Bowen
(74) Attorney, Agent, or Firm — Weaver Austin Villeneuve & Sampson LLP (57) ABSTRACT Disclosed are methods and apparatus for matching sets of text to objects are disclosed. In accordance with one embodiment, a set of text is obtained. For instance, the set of text may include a review. A numerical value is determined for each of a plurality of objects, where the numerical value indicates a likelihood that the corresponding one of the plurality of objects is a subject of the set of text. Each of the plurality of objects has an object type defined by a set of one or more attributes, each of the set of one or more attributes having associated therewith a corresponding set of one or more parameters, wherein the numerical value is determined using the set of text and a value of each of the set of one or more parameters for each of the set of one or more attributes. One of the plurality of objects that is most likely to be the subject of the set of text is identified based upon the numerical value that has been determined for each of the plurality of objects.

21 Claims, 6 Drawing Sheets

(56) References Cited

U.S. PATENT DOCUMENTS

| | | |
|---|---|---|
| 2008/0215571 A1* | 9/2008 | Huang et al. .................. 707/5 |
| 2009/0048823 A1* | 2/2009 | Liu et al. ....................... 704/9 |
| 2009/0055381 A1* | 2/2009 | Wu et al. ....................... 707/5 |
| 2009/0063469 A1* | 3/2009 | Gross ............................ 707/5 |
| 2009/0063470 A1* | 3/2009 | Peled et al. ................... 707/5 |
| 2009/0106226 A1* | 4/2009 | Ojakaar et al. ................ 707/5 |
| 2009/0106697 A1* | 4/2009 | Ward et al. ................. 715/835 |
| 2009/0144609 A1* | 6/2009 | Liang et al. ................ 715/230 |
| 2009/0193011 A1* | 7/2009 | Blair-Goldensohn et al. .... 707/5 |
| 2009/0265332 A1* | 10/2009 | Mushtaq et al. .................. 707/5 |
| 2009/0271365 A1* | 10/2009 | Chen et al. ........................ 707/3 |
| 2009/0319342 A1* | 12/2009 | Shilman et al. ................. 705/10 |
| 2010/0050118 A1* | 2/2010 | Chowdhury et al. ......... 715/810 |
| 2011/0022431 A1* | 1/2011 | Ameling et al. ................. 705/7 |
| 2011/0060746 A1* | 3/2011 | Dalvi et al. ................... 707/750 |
| 2011/0078157 A1* | 3/2011 | Sun et al. ..................... 707/749 |

\* cited by examiner

If you like Tanto's Japanese Restaurant, you'll like Gochi. We've eaten here several times for both lunch and dinner.

I recommend going for lunch because, like Tanto, they offer lunch specials (set meals) that are only available at that time. Of course, you can still order from the full menu, but you'll get a better value for lunch when you order one of the specials.

Strange that I have not written a review for Gochi.

Overall:
- It's definitely the best Japanese tapas in the entire south bay. No wonder people from San Fran will drive down to dine here. Most people know this place anyway. For a big group during weekends, make reservation 2 weeks ahead to be safe...

TRANSLATION MODEL AND METHOD FOR MATCHING REVIEWS TO OBJECTS

BACKGROUND OF THE INVENTION

The present invention relates generally to computer implemented and automatic matching of text to an object that is a subject of the text.

Users of the World Wide Web are familiar with the various services available on the Web for locating content of interest. Search engines are provided by a number of entities and search capabilities are embedded in many web sites. For instance, many web sites provide search applications that enable users to search the content of the web sites.

A large amount of content available on the Internet is unstructured and therefore difficult to categorize. For instance, blogs, forums, and newspapers include unstructured content that cannot easily be captured by search engines. As a result, results provided in response to a user's search query often do not capture a large amount of information that may be pertinent to the user's query.

SUMMARY OF THE INVENTION

Methods and apparatus for automatically matching sets of text to objects are disclosed. In accordance with one embodiment, a set of text is obtained. A numerical value is determined for each of a plurality of objects, where the numerical value indicates a likelihood that the corresponding one of the plurality of objects is a subject of the set of text. Each of the plurality of objects has an object type defined by a set of one or more attributes, each of the set of one or more attributes having associated therewith a corresponding set of one or more parameters, wherein the numerical value is determined using the set of text and a value of each of the set of one or more parameters for each of the set of one or more attributes. One of the plurality of objects that is most likely to be the subject of the set of text is identified based upon the numerical value that has been determined for each of the plurality of objects.

In accordance with yet another embodiment, a set of text is obtained. A numerical value for each of a plurality of objects is determined using the set of text and a set of one or more weighting values corresponding to each of one or more attributes that define an object type shared by the plurality of objects, where the numerical value indicates a likelihood that the corresponding one of the plurality of objects is a subject of the set of text. One of the plurality of objects that is most likely to be the subject of the set of text is determined based upon the numerical value corresponding to each of the plurality of objects.

In accordance with yet another embodiment, a set of text is obtained. A numerical value is determined for each of a plurality of objects, the numerical value indicating a likelihood that the corresponding one of the plurality of objects generated (or could have generated) the set of text, where the plurality of objects have an object type defined by a set of one or more attributes, each of the set of one or more attributes having associated therewith a corresponding set of one or more parameters, wherein the numerical value is determined using the set of text and a value of each of the set of one or more parameters for each of the set of one or more attributes. One of the plurality of objects that is most likely to have generated the set of text is identified based upon the numerical value that has been determined for each of the plurality of objects.

In accordance with yet another embodiment, the set of text is a review. Each of the plurality of objects may be an entity, article, item, or service, or otherwise identify an entity, article, item, or service. For instance, each of the plurality of objects may identify a service or product, or identify an entity providing a service or product.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable a set of text (e.g., unstructured text including a plurality of words) to be matched to one of a plurality of objects that is most likely to be a subject of the set of text. The set of text may be obtained from a variety of sources, including blogs, newspapers, or articles that may be available via a network such as the Internet. The set of text may include user-generated content such as a review.

In the following description, the term "object" is used to refer generally to an entity, article, item, or service, which may be a subject of a set of text. In one embodiment, an object may be represented via instantiation using an object-oriented language. However, it is important to note that the use of an object-oriented language to represent an object is merely one embodiment. Thus, the term object as used throughout is not intended to limit the scope of the disclosed embodiments to the use of an object-oriented language.

In order to describe a specific implementation of the disclosed embodiments, the examples set forth herein will be described with reference to matching reviews to objects. However, it is important to note that these examples are merely illustrative, and the disclosed embodiments may be applied to match sets of text other than reviews to objects.

In recent years, the Internet has been a main source of information for millions of users. These users rely on the Internet to search for information of interest to them. One conventional way for users to search for information is to initiate a search query through a search service's web page. Typically, a user can enter a query including one or more search term(s) into an input box on the search web page and then initiate a search based on such entered search term(s). In response to the query, a web search engine generally returns an ordered list of search result documents.

A document may be defined as a Uniform Resource Locator (URL) that identifies a location at which the document can be located. The document may be located on a particular web site, as well as a specific web page on the web site. For instance, a first URL may identify a location of a web page at which a document is located, while a second URL may identify a location of a web site at which the document can be located.

Sets of text such as reviews are ubiquitous on the Internet. Reviews exist in a variety of places on the Internet, including e-commerce websites such as Amazon.com, dedicated review websites such as Yelp.com, aggregation websites such as nextag.com, blogs, forums, newspapers, etc. With an increased pressure on search engines to present a holistic view of search results, it would be useful if search engines could collect and "understand" unstructured content, including user-generated content such as reviews. This would be particularly useful for queries for which many reviews exist. For instance, such queries could relate to shopping, dining, products, movies, etc. Accordingly, the search engine is faced with the review matching problem.

Various web sites are dedicated review websites that enable users to submit reviews, as well as search the web sites to read other users' reviews. However, these reviews are generally submitted in a structured format in order to enable the web sites to organize and retrieve the user-submitted reviews. Even though these reviews are submitted in a structured format, it can still be difficult for a search engine to identify the subject of these reviews.

Deciphering the object that is the subject of a review can be difficult. Similarly, identifying the subject of a review can be daunting, particularly where the text of the review is unstructured. In other words, where the text of the review is not organized in a particular fashion, it can be even more difficult to identify the primary focus of the review.

Figure 1:
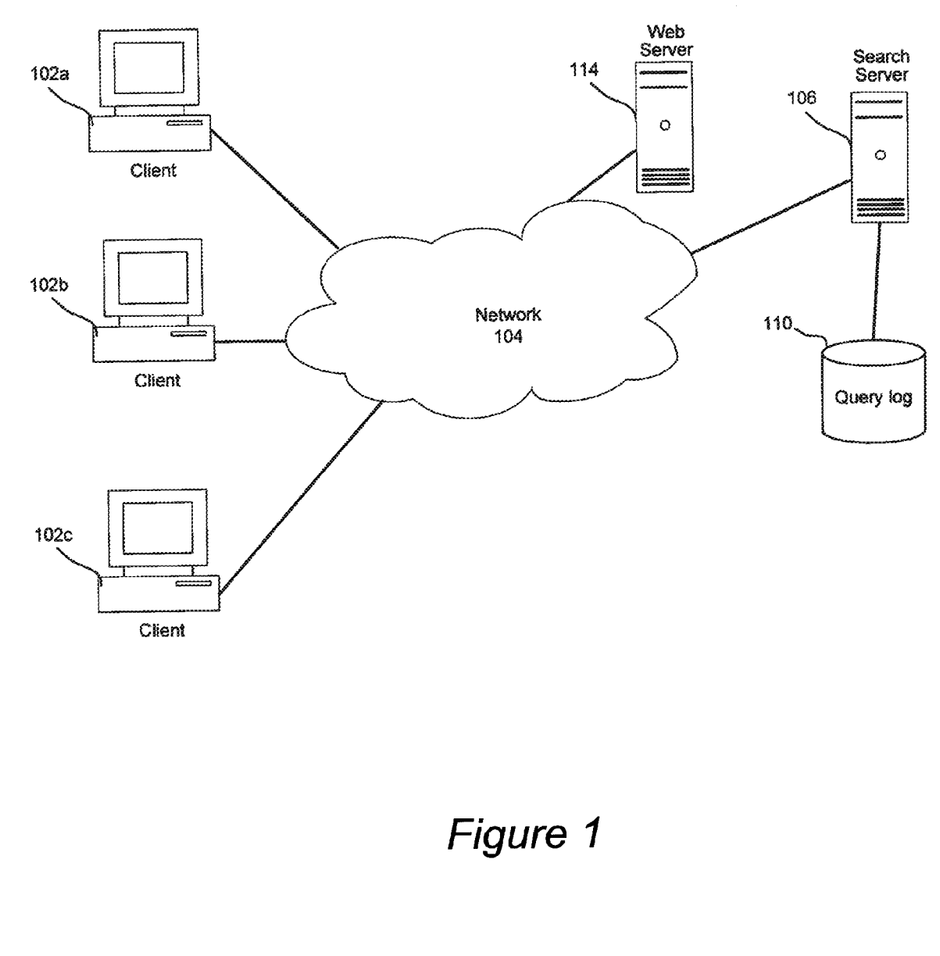
FIG. 1 is a block diagram illustrating an example system in which various embodiments may be implemented.

FIG. 1 illustrates an example network segment in which various embodiments of the invention may be implemented. As shown, a plurality of clients 102*a*, 102*b*, 102*c* may access a search application, for example, on search server 106 via network 104 and/or access a web service, for example, on web server 114. The network may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A search application generally allows a user (human or automated entity) to search for information that is accessible via network 104 and related to a search query including one or more search terms. The search terms may be entered by a user in any manner. For example, the search application may present a web page having any input feature to the client (e.g., on the client's device) so the client can enter a query including one or more search term(s). In a specific implementation, the search application presents an input box into which a user may type a query including any number of search terms. Embodiments of the present invention may be employed with respect to any search application. Example search applications include Yahoo! Search, Google, Altavista, Ask Jeeves, etc. The search application may be implemented on any number of servers although only a single search server 106 is illustrated for clarity.

The search server 106 (or servers) may have access to one or more query logs 110 into which search information is retained. For example, the query logs 110 may be retained in one or more memories that are coupled to the search server 106. Each time a user performs a search on one or more search terms, information regarding such search may be retained in the query logs 110. For instance, the user's search request may contain any number of parameters, such as user or browser identity and the search terms, which may be retained in the query logs 110. Additional information related to the search, such as a timestamp, may also be retained in the query logs 110 along with the search request parameters. When results are presented to the user based on the entered search terms, parameters from such search results may also be retained in the query logs 110. For example, the specific search results, such as the web sites, the order in which the search results are presented, whether each search result is a sponsored or algorithmic search result, the owner (e.g., web site) of each search result, whether each search result is selected (i.e., clicked on) by the user (if any), and/or a timestamp may also be retained in the query logs 110.

Upon receiving a search query, the search server 106 may identify and present the appropriate web pages that are pertinent to the query. For instance, the search server 106 may identify an object that is pertinent to the search query, and present reviews of the object. The information that is available on the Internet may be processed in accordance with various embodiments of the invention, enabling more complete search results to be provided to the user. For instance, the subject of reviews on various web pages may be identified, enabling reviews of a particular object to be aggregated and analyzed. The identification of the subject of reviews and the matching of reviews to objects is a complex process, as will be described in further detail below.

Embodiments disclosed herein may be implemented via the search server 106 and/or the clients 102*a*, 102*b*, 102*c*. For example, various features may be implemented via a web browser on the clients 102*a*, 102*b*, 102*c*. The disclosed embodiments may be implemented via software and/or hardware.

Figure 2A:
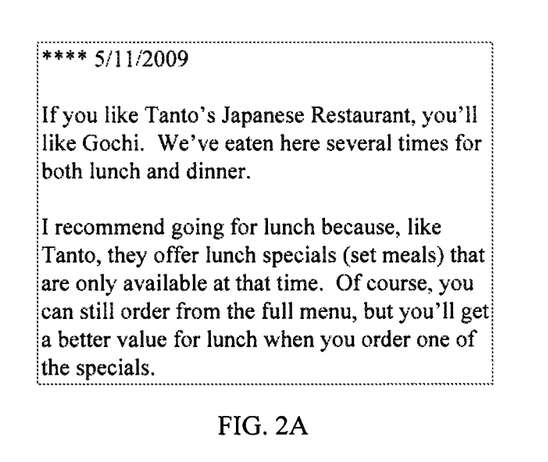
FIGS. 2A-B illustrate example reviews that may be matched to objects in accordance with various embodiments.
Figure 2B:
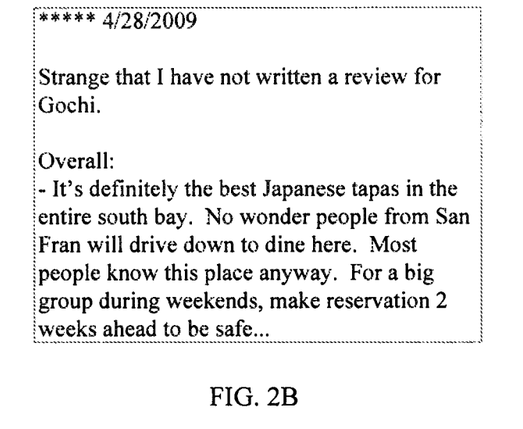

FIGS. 2A-B illustrate example reviews to which the disclosed embodiments may be applied. As shown in FIG. 2A, a review (or other set of text) may identify two different objects (e.g., restaurants). In this example, the review mentions Tanto's Japanese Restaurant, as well as Gochi. Thus, review web pages might mention other objects that are peripheral to the review.

Similarly, the review shown in FIG. 2B does not specifically identify the address of the restaurant that is the subject of the review. Rather, the review simply indicates that the restaurant is in the "south bay." Thus, the information revealed about a review might be incomplete or surrogate. As a result, it can be difficult for a standard search engine to categorize such reviews correctly.

Figure 3:
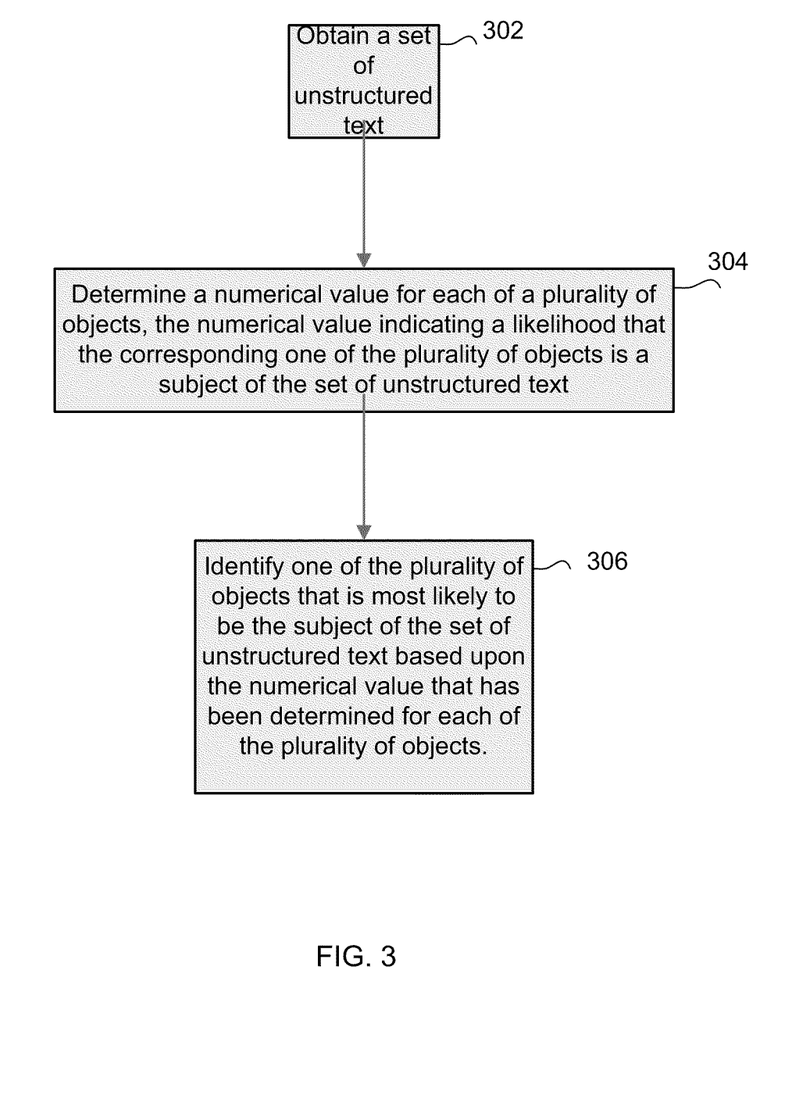
FIG. 3 is a process flow diagram illustrating an example method of matching a set of text such as a review to an object.

FIG. 3 is a process flow diagram illustrating an example method of identifying an object that is most likely to be a subject of a set of text. A set of text may be obtained at 302. For example, the set of text may include a review of an entity (e.g., a restaurant). The set of text may be obtained locally (e.g., from a memory) or via a network (e.g., the Internet). For instance, the set of text may be obtained from blogs, newspapers, forums, etc.

A numerical value may be determined at 304 for each of a plurality of objects, where the numerical value indicates a likelihood that the corresponding one of the plurality of objects is a subject of the set of text (e.g., review). In other words, the numerical value may indicate a likelihood (e.g., probability) that the set of text could be generated from the corresponding one of the plurality of objects using a generative model, as will be described in further detail below. The objects may be obtained locally (e.g., from a memory) or via a network (e.g., the Internet).

In one embodiment, the plurality of objects to which a set of text is "compared" share an object type that defines the "structure" of the objects. For example, the type of object may be an entity providing a service, an entity providing a product, a product, or a service. Entities providing a service may include businesses such as restaurants, as well as individuals such as politicians. Entities providing a product may include stores that sell the product, as well as companies manufacturing or distributing the product. It is important to note that a product need not be a tangible item. For instance, products may include electronic versions of songs, movies or written material such as books or articles, as well as tangible products such as physical books, Digital Video Disks (DVDs), computers, etc. Services may include non-tangible events such as concerts, movies, or television shows. Thus, the object type may indicate a type of object that is the subject of the set of text (e.g., review).

An object type may be defined by a set of one or more attributes. Examples of attributes for a particular object type (e.g., entity) include a name of a corresponding object, a phone number associated with the object, or an address associated with the object, as well as other attributes. For example, where the object type is a restaurant, the set of attributes may include a name, phone number, address, and type of cuisine. Thus, in this example, the object type has associated therewith four attributes. As another example, where the object type is a physician, the set of attributes may include a name, phone number, address, and specialty (e.g., cardiologist). Thus, the number of attributes that define an object type may vary with the type of object. Each object may have a set of attribute values associated with the set of attributes. For instance, the attribute values associated with a particular physician may be:

Name: Tom Smith
    Phone Number: (510) 663-1111
    Address: San Francisco
    Specialty: Radiologist.

The numerical value may be determined using the set of text and a value of each of a set of one or more parameters for each of the set of one or more attributes. In one embodiment, the set of parameters includes three different parameters: an attribute parameter ($\alpha$), an attribute word parameter ($\beta$), and an attribute translation parameter (t). The attribute parameter indicates a probability that the corresponding one of the set of attributes is present in the set of text. The attribute word parameter indicates a probability that a particular word from the corresponding one of the set of attributes is present in the set of text. The attribute translation parameter indicates a probability that a translation of a word from the corresponding one of the set of attributes is present in the set of text.

For example, the numerical value may be determined for each of the plurality of objects via a formula that incorporates parameter values for the set of parameters for each of the set of attributes. An example method of determining parameter values for the object type will be described in further detail below with will be described in further detail below reference to FIG. 4. A more detailed method of determining parameter values will be described in further detail below with reference to a generative model. One of the plurality of objects that is most likely to be the subject of the set of text may be identified at 306 based upon the numerical value that has been determined for each of the plurality of objects.

Once an object has been identified, the set of text (e.g., review) may be associated with the identified object. Thus, sets of text such as reviews may be aggregated. Similarly, at least a portion of the information contained in all sets of text such as reviews for a particular object (e.g., restaurant) may be aggregated. For instance, where numerical ratings are provided in reviews associated with an object, an average rating for an object may be computed based upon the numerical ratings.

The matching of reviews to objects may be used in a variety of review-related applications. For instance, the disclosed embodiments may be implemented to localize a review on a web page such as a blog, where the review is not the only piece of text present on the page. Similarly, the disclosed embodiments may also be used to identify reviews of multiple objects on a single web page.

Figure 4:
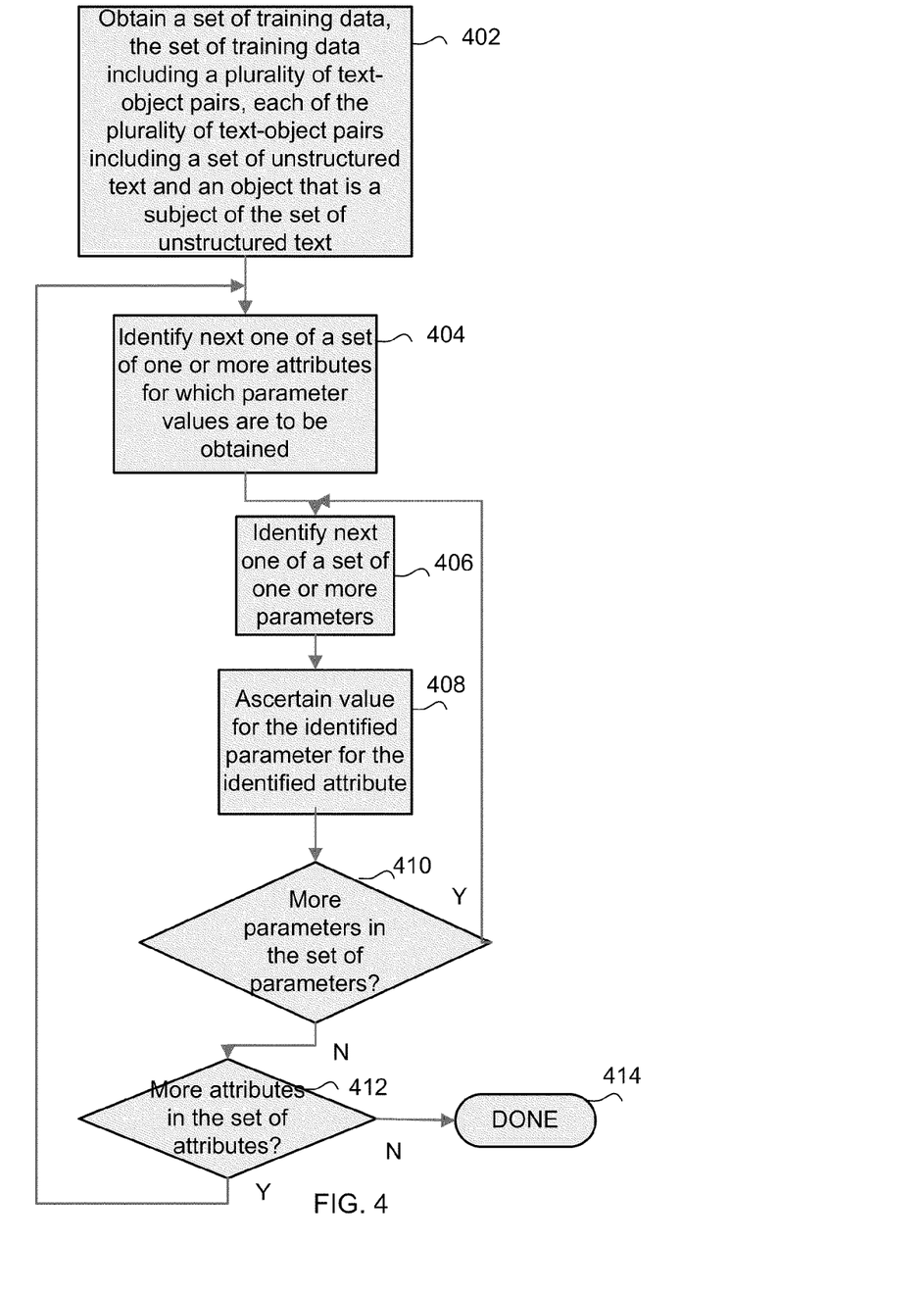
FIG. 4 is a process flow diagram illustrating an example method of obtaining parameter values for use in matching a set of text such as a review to an object.

FIG. 4 is a process flow diagram illustrating an example method of obtaining parameter values for a set of parameters for use in association with a particular object type. In order to obtain parameter values for each of the parameters for each of the set of attributes defining an object type, a set of training data may be used. Specifically, parameter values may be "learned" based upon the set of training data. Thus, a set of training data may be obtained at 402, where the set of training data includes a plurality of text-object pairs, each of the plurality of text-object pairs including a set of text and a corresponding "matching" object that is a subject of the set of text. For instance, each of the text-object pairs may include a restaurant review that is paired with the specific restaurant that is the subject of the review. The parameter values for each of the parameters may be obtained for each of the set of attributes based upon the training set, as will be described in further detail below.

As shown in this simplified example, the next one of the set of one or more attributes for which parameter values are to be obtained may be identified at 404. A next one of the set of one or more parameters may be identified at 406. A value for the identified parameter associated with the identified attribute may be ascertained at 408. If there are more parameters in the set of parameters at 410, the process may continue at 406 for the remaining parameters. If it is determined at 410 that values for all parameters in the set of parameters have been ascertained for the identified attribute, the process may continue at 412 for any remaining attributes in the set of attributes at 412. If more attributes remain in the set of attributes, the process continues at 404 to obtain parameter values for the next attribute. If parameter values have been obtained for each attribute in the set of attributes, the process ends at 414.

Problem Formulation

In order to match reviews to objects, a mathematical model for generating a word in a review for an object from its attributes may be applied. Specifically, the model may choose an attribute of an object, then select a word in the chosen attribute, and then output a translation of the selected word according to a translation model. The translation model may be an object-type dependent or attribute dependent translation model. For instance, for the attribute "cuisine" for the object-type "restaurant," the word "Chinese" may have corresponding translations "Asian," "kung pao," and "dim sum."

Let ϵ be a given set of objects. Each object e∈ϵ has a set of attributes. For an object e, let $e_k$ be the contents of its kth attribute; we can treat the content of each attribute to be a bag of words. We use the notation u∈$e_k$ to denote that the word u is present in the kth attribute of e.

The review matching problem can be stated as follows: given a review which is mainly about one of the objects in ϵ, find the object that is being reviewed.

For example, let ϵ be a set of restaurants. Each restaurant e∈ϵ in this example has three attributes: the name of the restaurant, the city in which the restaurant is located, and the type of cuisine the restaurant serves. Thus, for a particular restaurant, each of the attributes may have an associated value. This may be accomplished by instantiating a restaurant object such that a particular restaurant is an instance of a restaurant object. Example attribute values for a particular restaurant are:

Name: Gochi Japanese Fusion Tapas Restaurant
City: Cupertino
Cuisine: Japanese, Tapas Generative Model A model for generating a word in a review of an object from its attributes may be referred to as a generative model. For example, the generative model may choose an attribute (e.g., cuisine). The generative model may then select a word in the chosen attribute (e.g., Japanese). The generative model may then output a translation of the selected word according to an attribute dependent translation model. An attribute dependent translation model may generate translations that are appropriate for the attribute. For instance, for the attribute "cuisine," "translations" may be "equivalent" terms that may be used to describe the same type of cuisine. Therefore, translations of Japanese may include "sushi," "unagi," and "croquette."

In this example, a review about Gochi restaurant might be composed of words generated from its name (words such as "gochi," "restaurant"), its city (Cupertino), or its cuisine (words such as "Japanese," "tapas"). These words may sometimes appear as they are, and sometimes may get translated to other words. For instance, "Cupertino" (city) might have translations "south bay" or "bay area," while "Japanese" (cuisine) might have translations such as "croquette" or "unagi." Generic words such as "is," "of," etc. may be translated with the same probability from any of the words in any of the attributes, for all objects.

Let K denote the set of attributes of the objects and let V denote the vocabulary. Let α be a probability distribution over K. We use $α_k$ to denote the probability of attribute k. For each k∈K, let $β_k$ be a function that assigns a positive real weight $β_k(u)$ to each word u in V. Finally, for each k∈K and u∈V, let $t_k(•|u)$ be a probability distribution over V such that the probability of a word w is given by $t_k(w|u)$. The parameters α, β, and t are collectively referred to as θ.

Given parameters θ, a word w in review is generated from an object e as follows. First, an attribute k is picked with probability $α_k$. Then, a word u is picked from the set $e_k$ with probability proportional to $β_k(u)$. This is given by probability $β_k(u|e)=β_k(u)/B_k(e)$, where $B_k(e)=Σ_{U∈e_k}β_k(u)$ is the normalizing factor. Then, word w is picked with probability $t_k(w|u)$.

Thus, the probability of a word w being generated from an object e is given by $$P_θ(w|e) = \sum_k \sum_{u \in e_k} αk β_k(u|e) t_k(w|u). \quad (1)$$

Finally, the probability of a review r being generated from an object e is given by $$P_θ(r|e) = \prod_{w \in r} P_θ(w|e). \quad (2)$$

Suppose we have the following parameters:
$α_{name}=0.2$, $α_{city}=0.1$, $α_{cuisine}=0.7$.

Then, to generate a word of a review for the Gochi restaurant, we can pick the attribute cuisine with 0.7 probability. Suppose the $β_{cuisine}$ values are as follows:
$β_{cuisine}$(Japanese)=0.4,
$β_{cuisine}$(tapas)=0.1,
$β_{cuisine}$(italian)=0.3.

Then, having picked the attribute "cuisine," we will pick "Japanese" with probability 0.4/(0.4+0.1)=0.8. Finally, we look at the t values to pick a review word. Suppose we have the following:
$t_{cuisine}$(Japanese|Japanese)=0.5,
$t_{cuisine}$(croquette|Japanese)=0.1,
$t_{cuisine}$(unagi|Japanese)=0.3.

Then, we will pick "unagi" with 0.3 probability. The final probability of picking "unagi" for Gochi restaurant is 0.7*0.8*0.3=0.168.

Matching Review to Object Using Generative Model

Given the generative model as set forth above, the model may be applied to match reviews or other sets of text to objects. For a review r, we want to output the most likely object e* given by $$e^* = \arg\max_e P(e|r) = \arg\max_e \frac{P(e)}{P(r)} P(r|e).$$

In the absence of any information, we assume a uniform distribution for P[e]. Of course, additional information about the objects (e.g., restaurants), such as their rating or popularity, can be used to model P[e] more accurately. From this, we get $$e^* = \arg\max_e P(r|e),$$

where P(r|e) is given by (2). Thus, the object that is most likely to be a subject of the review r (or other set of text) may be obtained by solving for e*. In other words, e* may represent the object that is most likely to have generated the review.

Parameter Estimation

In order to estimate values for the parameters of the generative model, a training set of data may be used. For instance, the parameter estimation may be based upon the Expectation Maximization algorithm, where the maximization step involves a non-linear maximization problem solved using gradient descent. The learned parameters may then be used to find, given a review, one of a plurality of objects that is most likely to have generated the review.

A set of training data may include a set of review-object pairs, where each of the set of review-object pairs includes a review and a corresponding object that is a subject of the review. The training data may be viewed as a sequence of pairs (w, e), where w is a word from a review and e is the object of the corresponding review. We can use $w^{(i)}$ to denote the word in the ith pair and $e^{(i)}$ to denote the object in the ith pair.

Let $\mu_{u,k}^{(i)}$ denote the event that $w^{(i)}$ is generated from word u of the attribute k of object e. Consider the following function:

$$F(w,u,k;\theta,e)=\alpha_k \cdot \beta_k(u|e) \cdot t_k(w|u).$$

Then, we have $$P_\theta(w^{(i)}, \mu_{u,k}^{(i)}|e^{(i)})=F(w^{(i)}, u, k; \theta, e^{(i)}). \quad (3)$$

Clearly, $$P_\theta(w^{(i)}|e^{(i)}) = \sum_{k,u} P_\theta(w^{(i)}, \mu_{u,k}^{(i)}|e^{(i)}). \quad (4)$$

Our goal is to estimate θ so as to maximize $$\prod_i P_\theta(w^{(i)}|e^{(i)}),$$

or equivalently, to maximize $$\sum_i \log P_\theta(w^{(i)}|e^{(i)}). \quad (5)$$

We can use the Expectation Maximization (EM) method for heuristically solving this maximization problem.

E-step: In the E-step, given the current model $\theta^{(t)}$, we compute $$E^{(t)}(\mu_{u,k}^{(i)}) = \frac{F(w^i, u, k; \theta^t, e^i)}{\sum_{u',k'} F(w^{(i)}, u', k'; \theta^t, e^i)}$$

M-step: Since the original objective function is difficult to directly optimize for, we can instead compute $$\theta^{(t+1)} = \arg\max_e Q(\theta, \theta^{(t)}), \quad (6)$$

where $$Q(\theta, \theta^{(t)}) = \sum_i \sum_{k,u} E^{(t)}(\mu_{u,k}^{(i)}) \log p_\theta(w^{(i)}, \mu_{u,k}^{(i)}|e^{(i)})$$

$$= \sum_i \sum_{k,u} E^{(t)}(\mu_{u,k}^{(i)}) \log\left(\alpha_k \frac{\beta_k(u)}{B_k(e^{(i)})} t_k(w^{(i)}|u)\right)$$

By using the Lagrange multipliers method, we can compute the optimal parameters $\alpha^*_k$, $t^*_k$, $\beta^*_k$ of the new model $\theta^{(t+1)}$.

First, $$\alpha^*_k = \frac{g_k}{\sum_{k'} g_{k'}},$$

where $$g_k = \sum_{i,u} E^{(t)}(\mu_{u,k}^{(i)}).$$

Next, $$t^*_k(w|u) = \frac{f_k(u, w)}{\sum_{w'} f_k(u, w')},$$

where $$f_k(u, w) = \sum_{i: w^{(i)}=w} E^{(t)}(\mu_{u,k}^{(i)}).$$

Since we cannot obtain a closed form for $\beta^*_k$, we use the gradient descent method to estimate $\beta^*_k$. We obtain $$\Delta \beta_k(u) = \frac{\partial Q(\theta, \theta^{(t)})}{\partial \beta_k(u)}$$

$$= \sum \frac{E^{(t)}(\mu_{u,k}^{(i)})}{\beta_k(u)} - \sum_{i|u \in e_k^i} \frac{1}{B_k(e^{(i)})}$$

$$\left(\sum_{u'} E^{(t)}(\mu_{u',k}^{(i)})\right).$$

We can then solve the above non-linear equation using standard gradient descent.

Regularization

Since the example embodiment described above is under-constrained, the model may be regularized. This may be accomplished by adding an extra attribute (which may be numbered 0) to each object. The value of this extra attribute may be "Review." This extra attribute may account for generic review words that are not correlated with any specific attribute. For instance, in restaurant reviews, words like "tasty" and "dinner" do not have correlations with a specific city or cuisine. Therefore, the extra attribute, Review, may account for all such words. Specifically, $t_0(w|Review)$ may denote the probability that a word w is chosen from a generic review language. Thus, a generic parameter that corresponds to this extra attribute may indicate a probability that a generic word is present in the review.

Smoothing

The extra attribute, Review, (which may be numbered 0) may function as a generic review attribute. However, $\alpha_0$ will typically get driven down to zero. This phenomenon is the result of overfitting. For example, consider a generic word like "dinner." While all cuisines and cities should see the word with roughly the same frequency, it may not occur exactly with the same frequency due to sampling errors. Thus, the model may let "dinner" get completely accounted for by cities and cuisines.

In order to overcome the problem of overfitting, $\alpha_0$ may be constrained to have a high value. Given this constraint, the review attribute may accumulate all of the generic review words, and the remaining specific attributes may accumulate only words specific to those attributes.

Incorporating Additional Properties of Attribute

We can further improve the model accuracy and efficiency by incorporating additional knowledge about attributes. For instance, the scope of the translations of the attributes may be incorporated into the model. Consider attributes like "cuisine" and "city," which can get translated to several words specific to the attribute. However, other attributes such as "name" or "phone number" can only translate to themselves. In general, if we know the set of words each attribute can translate into, we can incorporate the knowledge to learn a more effective model.

In one embodiment, each attribute may be labeled as either "flexible" or "inflexible." A word in a "flexible" attribute can be translated into any word in the vocabulary, while a word in an "inflexible" attribute can only get translated into itself. By declaring attributes such as "name" and "phone number" as inflexible, we can avoid learning complete translation models for inflexible attributes, making the models much more compact and less noisy.

Figure 5:
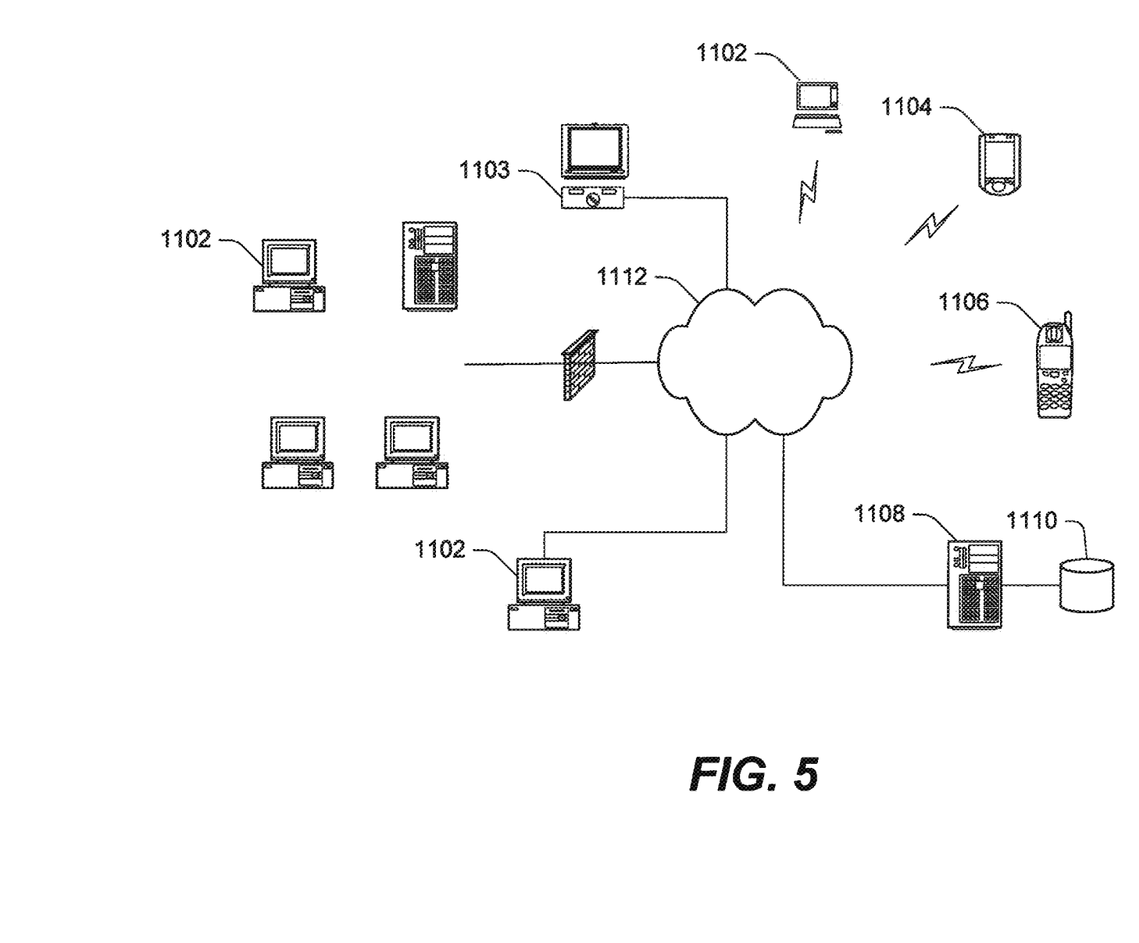
FIG. 5 is a simplified diagram of an example network environment in which various embodiments may be implemented.

Embodiments of the present invention may be employed to automatically identify the primary subject of reviews, as well as aggregate reviews in any of a wide variety of computing contexts. For example, as illustrated in FIG. 5, implementations are contemplated in which users interact with a diverse network environment via any type of computer (e.g., desktop, laptop, tablet, etc.) 1102, media computing platforms 1103 (e.g., cable and satellite set top boxes and digital video recorders), handheld computing devices (e.g., PDAs) 1104, cell phones 1106, or any other type of computing or communication platform.

And according to various embodiments, input that is processed in accordance with the invention may be obtained using a wide variety of techniques. For example, a search query may be obtained from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

Reviews may be matched to objects according to the disclosed embodiments in some centralized manner. This is represented in FIG. 5 by server 1108 and data store 1110 which, as will be understood, may correspond to multiple distributed devices and data stores. The invention may also be practiced in a wide variety of network environments (represented by network 1112) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The search apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, sets of text (e.g., reviews) to be matched to objects, objects, the result of the application of the disclosed methods (e.g., aggregated reviews), etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
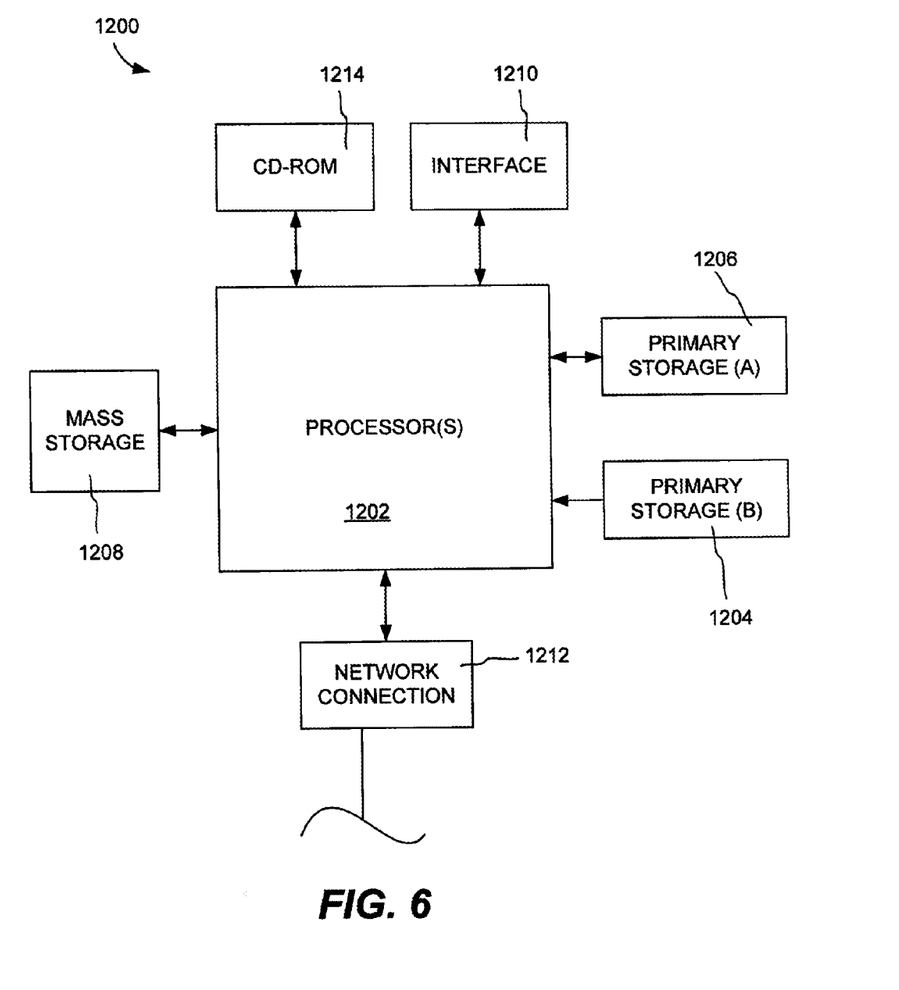
FIG. 6 illustrates an example computer system in which various embodiments may be implemented.

FIG. 6 illustrates a typical computer system that, when appropriately configured or designed, can serve as a system of this invention. The computer system 1200 includes any number of processors 1202 (also referred to as central processing units, or CPUs) that are coupled to storage devices including primary storage 1206 (typically a random access memory, or RAM), primary storage 1204 (typically a read only memory, or ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. For instance, the disclosed embodiments may relate to the matching of sets of text to objects that are subjects of the sets of text. Thus, the disclosed embodiments are not limited to the matching of reviews to objects. Therefore, the present embodiments are to be considered as illustrative and not restrictive and the invention is not to be limited to the details given herein, but may be modified within the scope and equivalents of the appended claims.

What is claimed is:

1. A method, comprising:
   obtaining a review including a set of text, wherein the review includes user-generated content;
   determining, for the review, a numerical value for each of a plurality of objects, the numerical value indicating a likelihood that a corresponding one of the plurality of objects could have generated the review, the plurality of objects each representing a corresponding one of a plurality of entities;
   identifying one of the plurality of objects that, if the review were generated from one of the objects, is most likely to have generated the review based, at least in part, upon the numerical value that has been determined for each of the plurality of objects, wherein the identified one of the plurality of objects indicates the one of the plurality of entities that is most likely to be a primary subject of the review;
   associating the review with the identified one of the plurality of objects such that a plurality of reviews associated with the identified one of the plurality of objects includes the review; and
   aggregating information from at least a portion of the plurality of reviews.

2. The method as recited in claim 1, further comprising: ascertaining a type of entity that is the primary subject of the review.

3. The method as recited in claim 1, wherein the plurality of objects are associated with a type of entity that is the primary subject of the review.

4. The method as recited in claim 3, wherein the type of entity is an entity providing a service, an entity providing a product, a product, or a service.

5. The method as recited in claim 1, further comprising:
   receiving a search query;
   ascertaining one of the plurality of objects that is pertinent to the search query; and
   providing a set of reviews associated with the ascertained one of the plurality of objects.

6. The method as recited in claim 1, wherein the information comprises numerical ratings of an entity identified by a set of attributes of the identified one of the plurality of objects.

7. The method as recited in claim 1, wherein each of the plurality of objects has been generated using a computer-programming language.

8. A method, comprising:
   obtaining a set of text, wherein the set of text includes user-generated content;
   determining, for the set of text, a numerical value for each of a plurality of objects, the numerical value indicating a likelihood that the corresponding one of the plurality of objects could have generated the set of text, the plurality of objects each representing a corresponding one of a plurality of entities;
   identifying one of the plurality of objects that, if the set of text were generated from one of the objects, is most likely to have generated the set of text based, at least in part, upon the numerical value that has been determined for each of the plurality of objects, wherein the identified one of the plurality of objects indicates the one of the plurality of entities that is most likely to be a primary subject of the set of text;
   associating the set of text with the identified one of the plurality of objects such that a plurality of sets of text associated with the identified one of the plurality of objects includes the set of text; and
   aggregating information from at least a portion of the plurality of sets of text.

9. The method as recited in claim 8, further comprising: ascertaining a type of entity that is the primary subject of the set of text.

10. The method as recited in claim 8, wherein each of the plurality of objects has a set of one or more parameters including an attribute parameter indicating a probability that the corresponding one of a set of attributes is present in the set of text.

11. The method as recited in claim 8 wherein each of the plurality of objects has a set of one or more parameters including an attribute word parameter indicating a probability that a word from the corresponding one of a set of attributes is present in the set of text.

12. The method as recited in claim 8, wherein each of the plurality of objects has a set of one or more parameters including an attribute translation parameter indicating a probability that a translation of a word from the corresponding one of a set of attributes is present in the set of text.

13. The method as recited in claim 8, wherein each of the plurality of objects has a set of one or more parameters including a generic parameter that indicates a probability that a generic word is present in the set of text.

14. The method as recited in claim 8, further comprising:
   ascertaining, for each of the plurality of objects, a value of each of a set of one or more parameters defining an entity type.

15. The method as recited in claim 8, further comprising:
obtaining a training set, the training set including a plurality of text-object pairs, each of the plurality of text-object pairs including a set of text and an object that is a subject of the set of text; and
ascertaining, for the set of text, values for a set of one or more parameters based, at least in part, upon the training set.

16. An apparatus, comprising:
a processor; and
a memory, at least one of the processor or the memory being configured for:
obtaining a review including a set of text, wherein the review includes user-generated content;
determining, for the review, a numerical value for each of a plurality of objects, the numerical value indicating a likelihood that the corresponding one of the plurality of objects could have generated the review, the plurality of objects each representing a corresponding one of a plurality of entities;
identifying one of the plurality of objects that, if the review were generated from one of the objects, is most likely to have generated the review based, at least in part, upon the numerical value that has been determined for each of the plurality of objects, wherein the identified one of the plurality of objects indicates the one of the plurality of entities that is most likely to be a primary subject of the review;
associating the review with the identified one of the plurality of objects such that a plurality of reviews associated with the identified one of the plurality of objects includes the review; and
aggregating information from at least a portion of the plurality of reviews.

17. The apparatus as recited in claim 16, wherein the plurality of objects each have a set of one or more attributes including at least one of a name of an entity, a phone number associated with the entity, or an address associated with the entity.

18. An apparatus, comprising:
a processor; and
a memory, at least one of the processor or the memory being configured for:
obtaining a set of text, wherein the set of text includes user-generated content;
determining, for the set of text, a numerical value for each of a plurality of objects using the set of text, the numerical value indicating a likelihood that the corresponding one of the plurality of objects could have generated the set of text, each of the plurality of objects representing a corresponding one of a plurality of entities;
identifying one of the plurality of objects that, if the set of text were generated from one of the objects, is most likely to have generated the set of text based, at least in part, upon the numerical value corresponding to each of the plurality of objects, wherein the identified one of the plurality of objects indicates the one of the plurality of entities that is most likely to be a primary subject of the set of text;
associating the set of text with the identified one of the plurality of objects such that a plurality of sets of text associated with the identified one of the plurality of objects includes the set of text; and
aggregating information from at least a portion of the plurality of sets of text.

19. The apparatus as recited in claim 18, further comprising:
wherein an object type shared by the plurality of objects indicates a type of entity that is the primary subject of the set of text.

20. The apparatus as recited in claim 19, wherein the object type is one of a plurality of object types, wherein each of the plurality of object types is defined by a corresponding number of attributes.

21. The apparatus as recited in claim 19, wherein the object type defines a structure of the plurality of objects.

* * * * *